United States Patent [19]

Roper et al.

[11] Patent Number: 5,481,892
[45] Date of Patent: Jan. 9, 1996

[54] APPARATUS AND METHOD FOR FORMING A TUBULAR MEMBER

[76] Inventors: Ralph E. Roper, 2930 Somerset Bay, Indianapolis, Ind. 46240; Gary A. Webb, 1875 Windside, West Bloomfield, Mich. 48324; Douglas W. Tyger, 8262 Country Oaks Station, West Chester, Ohio 45069; Donald F. Lowen, 1841 Auburndale, West Bloomfield, Mich. 48324

[21] Appl. No.: 99,484

[22] Filed: Jul. 29, 1993

Related U.S. Application Data

[63] Continuation of Ser. No. 74,886, Jun. 10, 1993, abandoned, which is a continuation-in-part of Ser. No. 945,322, Sep. 15, 1992, abandoned, which is a continuation-in-part of Ser. No. 837,081, Feb. 13, 1992, Pat. No. 5,239,852, which is a continuation of Ser. No. 482,782, Feb. 21, 1990, abandoned, which is a continuation-in-part of Ser. No. 398,272, Aug. 24, 1989, abandoned.

[51] Int. Cl.$^6$ ............................................. B21D 9/15
[52] U.S. Cl. ................................... 72/61; 72/62; 29/421.1
[58] Field of Search .................................. 72/57, 58, 56, 72/59, 61, 62, 55; 29/421.1

[56] References Cited

U.S. PATENT DOCUMENTS

| Re. 33,990 | 7/1992 | Gudini | 72/367 |
|---|---|---|---|
| 203,842 | 5/1878 | Leland . | |
| 693,172 | 2/1902 | Sneddon . | |
| 1,542,983 | 6/1925 | Bergmann, Jr. . | |
| 1,943,560 | 1/1934 | Squires . | |
| 2,047,296 | 7/1936 | Squires . | |
| 2,777,500 | 1/1957 | Ekholm et al. . | |
| 2,892,254 | 6/1959 | Garvin | 72/58 |
| 3,105,537 | 10/1963 | Foster . | |
| 3,136,053 | 6/1964 | Powell . | |
| 3,220,098 | 11/1965 | Arbogast . | |
| 3,487,668 | 1/1970 | Fuchs, Jr. | 72/55 |
| 3,739,615 | 6/1973 | Tressel | 72/57 |
| 3,810,302 | 5/1974 | Broers et al. | 29/600 |
| 4,051,704 | 10/1977 | Kimura | 72/58 |
| 4,238,878 | 12/1980 | Stamm et al. | 29/421 R |
| 4,319,471 | 3/1982 | Benteler et al. | 72/59 |
| 4,454,745 | 6/1984 | Cudini | 72/370 |
| 4,567,743 | 2/1986 | Cudini | 72/61 |
| 4,662,204 | 5/1987 | Saegusa . | |
| 4,704,886 | 11/1987 | Evert et al. | 72/57 |
| 4,744,237 | 5/1988 | Cudini | 72/367 |
| 4,759,111 | 7/1988 | Cudini | 29/523 |
| 4,763,506 | 8/1988 | Zeng | 72/306 |
| 4,766,756 | 8/1988 | Shiue | 72/294 |
| 4,788,843 | 12/1988 | Seaman et al. | 72/58 |
| 4,827,747 | 5/1989 | Okada et al. | 72/59 |
| 4,829,803 | 5/1989 | Cudini | 72/367 |
| 4,989,482 | 2/1991 | Mason | 83/22 |
| 5,070,717 | 12/1991 | Boyd et al. | 72/55 |
| 5,339,667 | 8/1994 | Shah et al. | 72/58 |

FOREIGN PATENT DOCUMENTS

| 45-1344 | 1/1970 | Japan . | |
|---|---|---|---|
| 55-77934 | 5/1980 | Japan . | |
| 58-3738 | 3/1983 | Japan . | |
| 59-130633 | 11/1984 | Japan . | |
| 82229 | 5/1985 | Japan | 72/58 |
| 385146 | 3/1965 | Switzerland . | |
| 549199 | 7/1977 | U.S.S.R. . | |
| 519593 | 9/1939 | United Kingdom . | |
| 523948 | 2/1940 | United Kingdom . | |
| 2162446 | 2/1986 | United Kingdom . | |

Primary Examiner—David Jones
Attorney, Agent, or Firm—Willian Brinks Hofer Gilson & Lione

[57] ABSTRACT

An apparatus and method for forming a one-piece, complex-shaped tubular member from a tubular blank is provided. The tubular blank is placed in a die cavity defining a tube having at least two expanded portions and a bend therein. As the die cavity is closed around the tubular blank to form the bend, the interior of the tubular blank is pressurized to expand the tubular blank into the at least two expanded portions defined by the die cavity. When the bent and expanded tubular blank is removed from the die cavity, the ends of the tubular blank are cropped to form the finished tubular member.

19 Claims, 6 Drawing Sheets

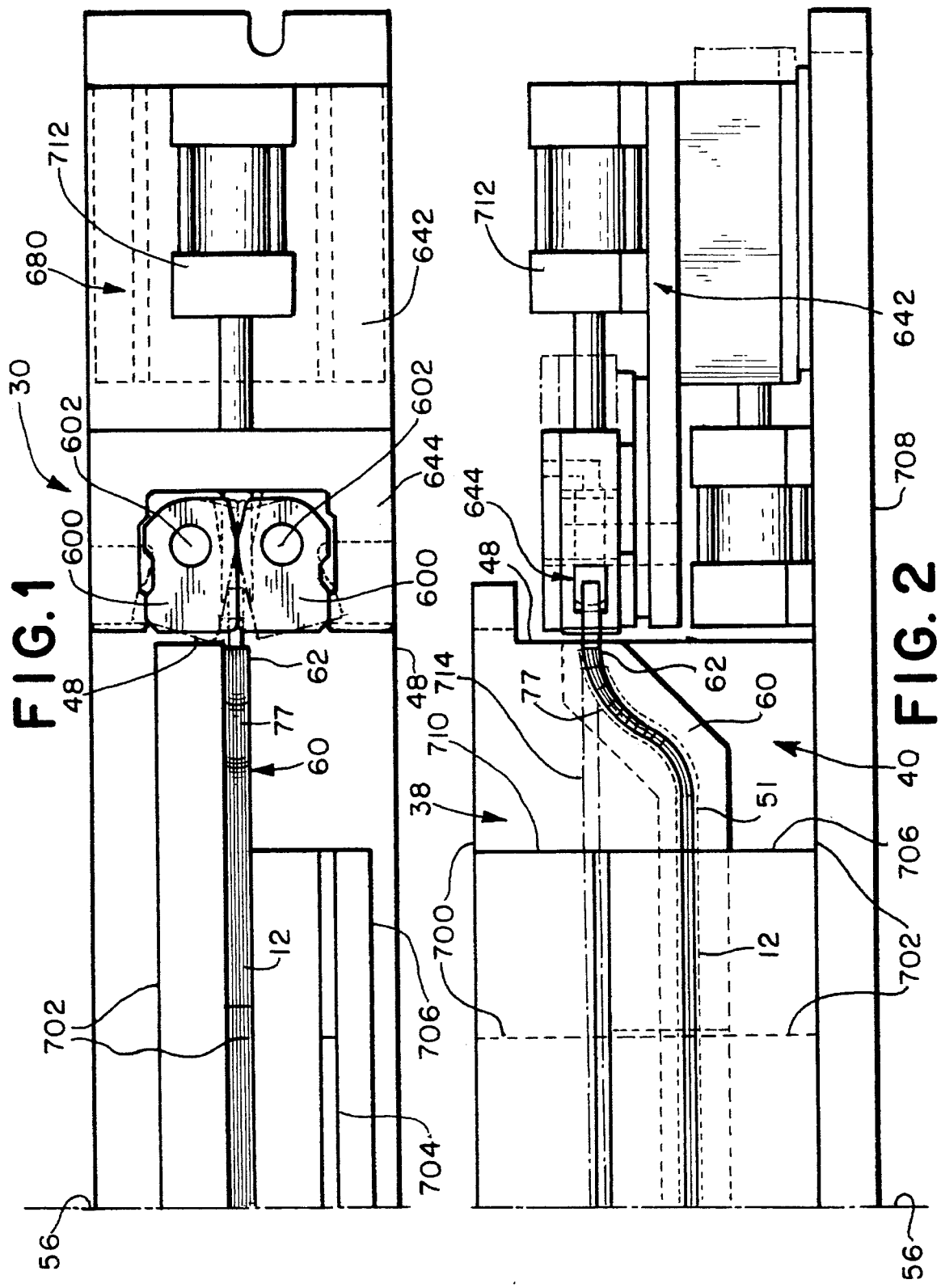

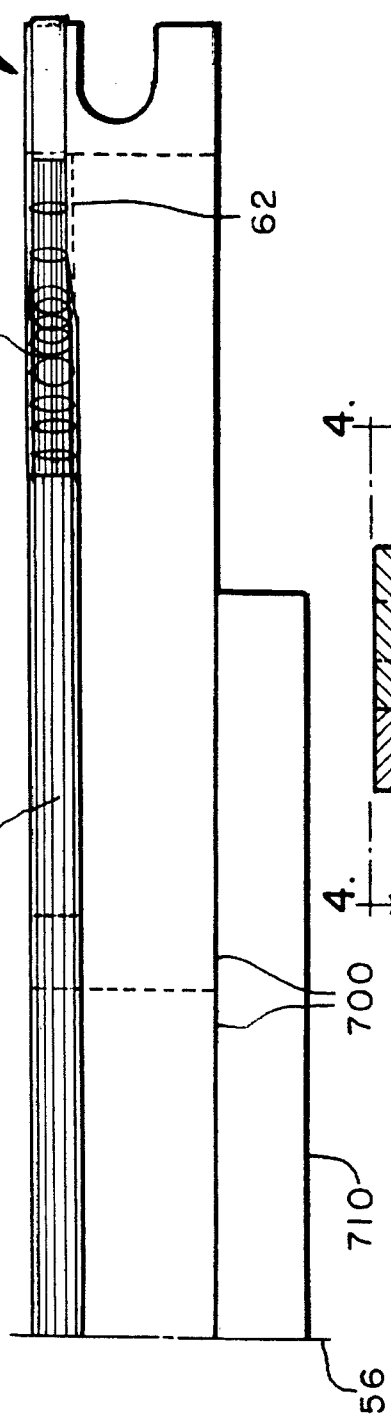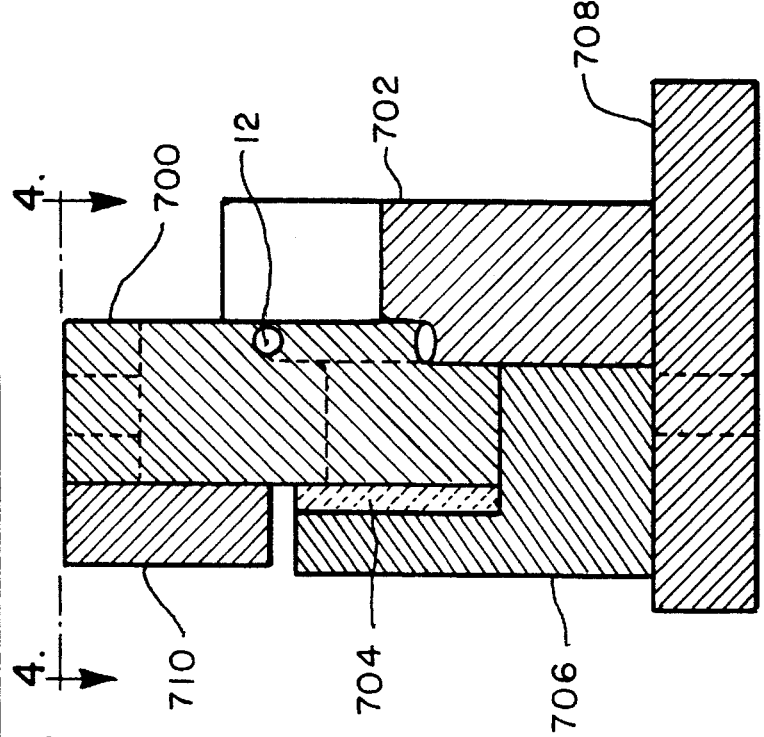

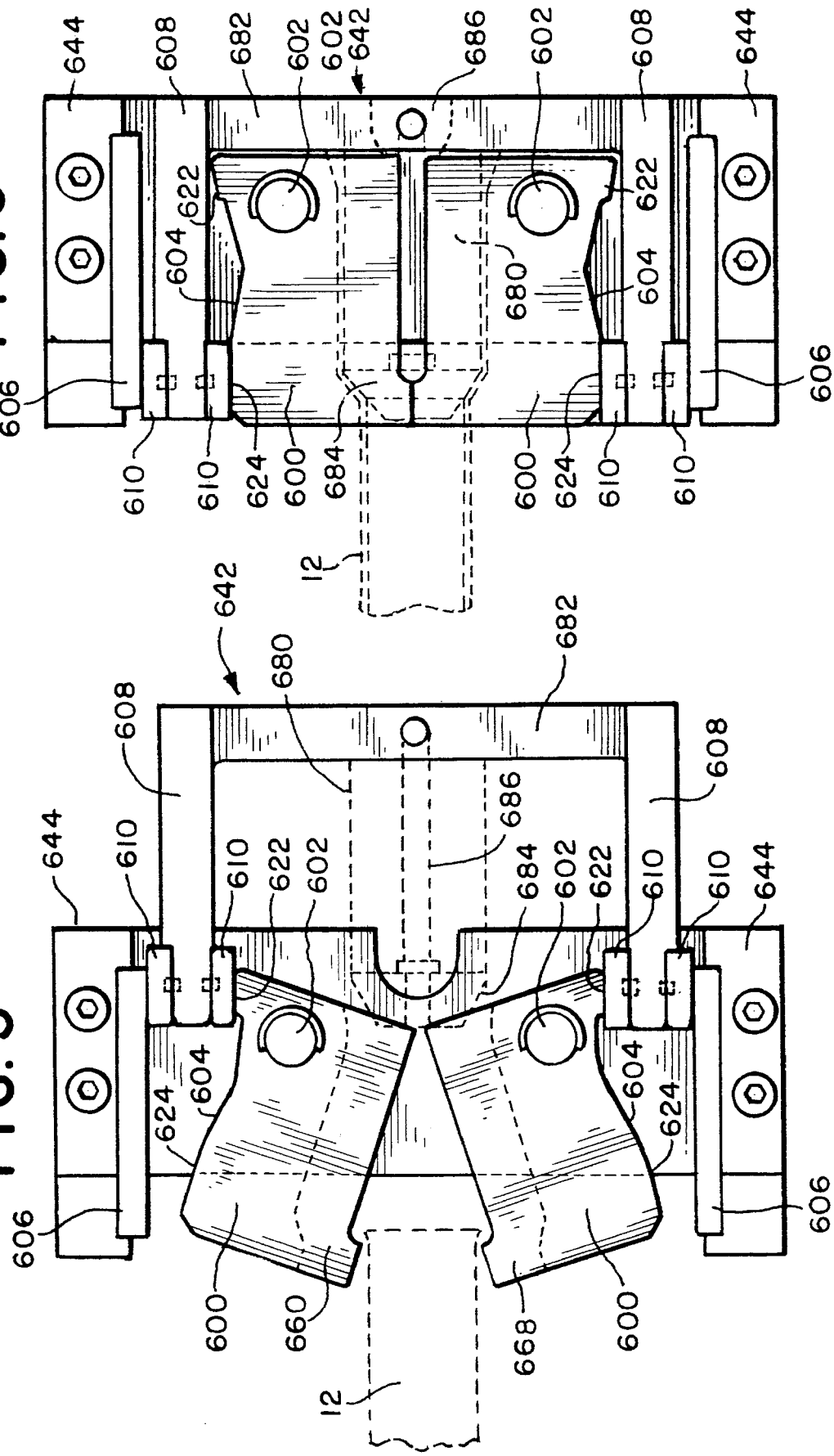

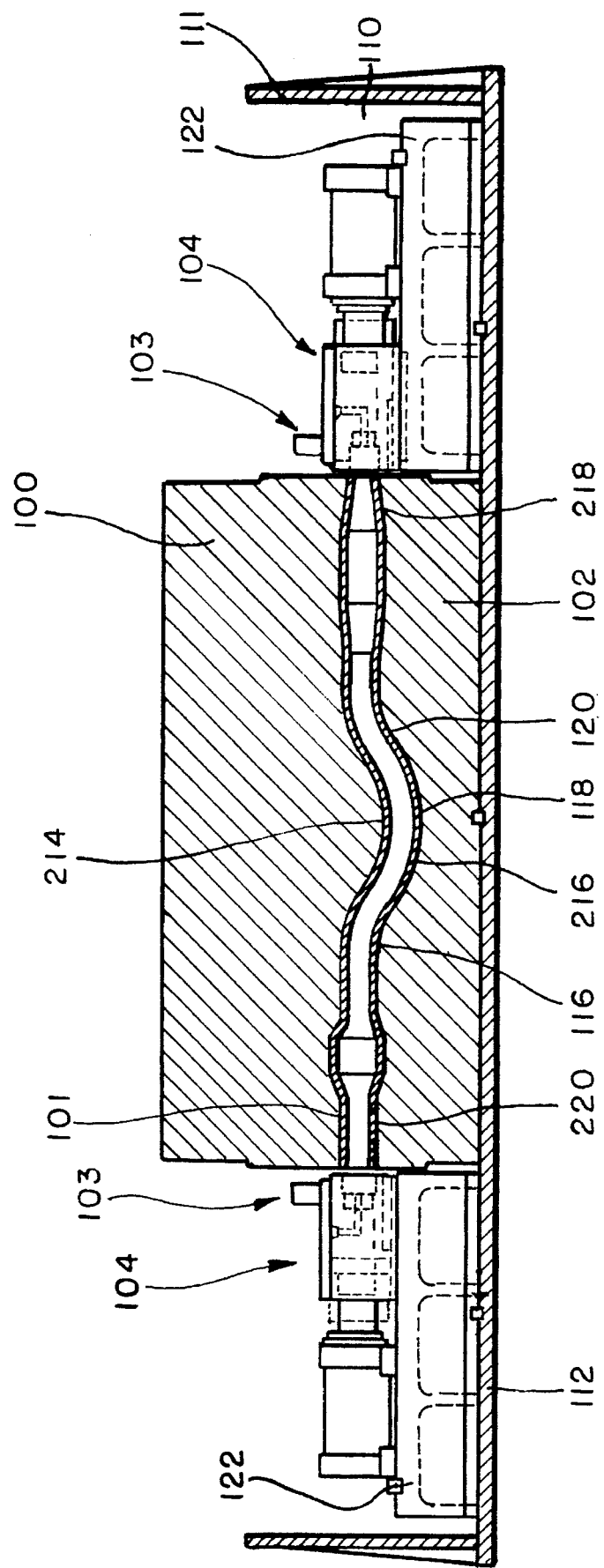

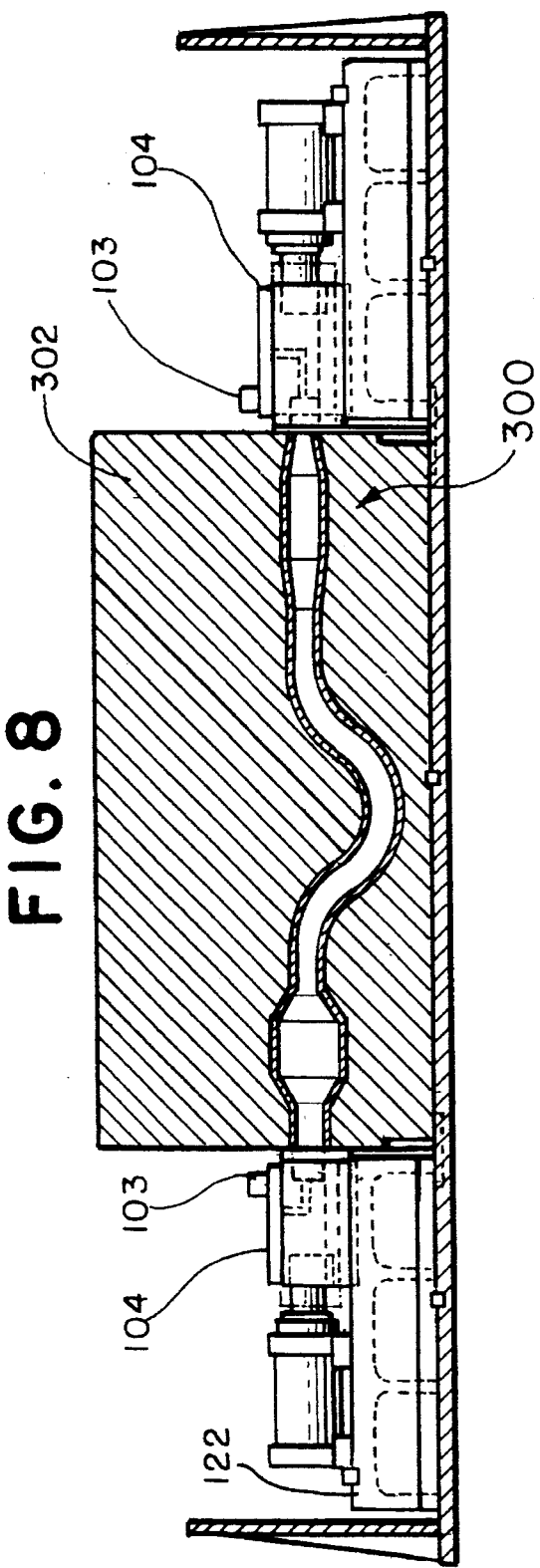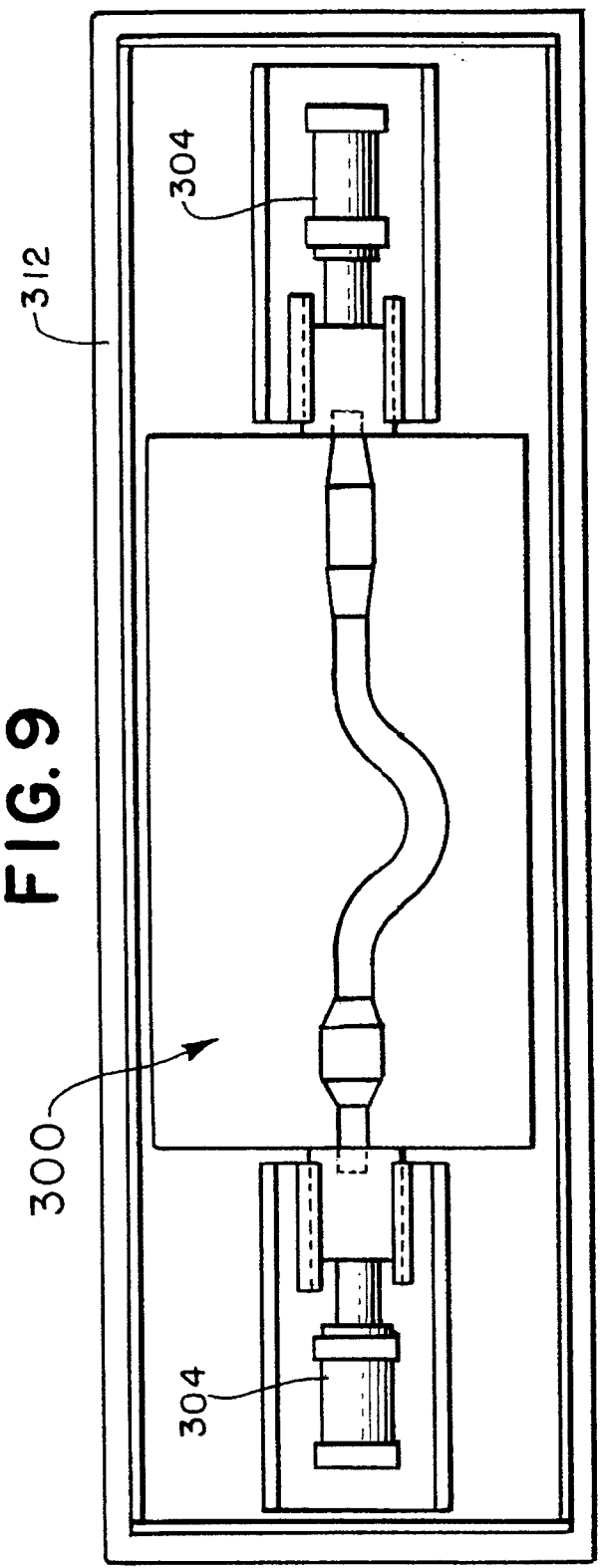

APPARATUS AND METHOD FOR FORMING A TUBULAR MEMBER

CROSS-REFERENCE TO RELATED APPLICATIONS

This application is a continuation of U.S. patent application Ser. No. 08/074,886, filed Jun. 10, 1993 and entitled "Apparatus and Method for Forming a Tubular Member", now abandoned, which is a continuation-in-part of U.S. patent application Ser. No. 07/945,322, filed Sep. 15, 1992, now abandoned, which is a continuation-in-part of Ser. No. 07/837,081, filed Feb. 13, 1992 (attorney docket no. 4397/20), now U.S. Pat. No. 5,239,852, which is a continuation of Ser. No. 07/482,782, filed Feb. 21, 1990 (attorney docket no. 4397/10), now abandoned, which is a continuation-in-part of Ser. No. 07/398,272, filed Aug. 24, 1989 (attorney docket no. 4397/8), now abandoned, U.S. Pat. No. 5,239,852 is hereby incorporated by reference.

BACKGROUND OF THE INVENTION

1. Field of the Invention

The present invention relates to the field of cold forming tubular materials and in particular to an apparatus and method for forming a complex-shaped tubular member from a tubular blank.

2. Description of the Prior Art

Appliance door handles and the like are currently constructed from multiple handle sections. For example, a typical oven door handle consists of three sections—a main tubular member and two curved end pieces which overlap the ends of the tubular portion and are connected thereto. The overlap of material between the end pieces and the tubular member results in a large amount of scrap material, especially when the number of appliance door handles produced each year is considered. Also, the additional step of connecting the end pieces to the main tubular member increases the time required to construct each door handle.

Therefore, in order to decrease the amount of material and labor consumed by the conventional production process discussed above, efforts have been made to develop a technique for forming one-piece appliance door handles. Since appliance door handles typically have curved ends, such a technique requires the bending and bulging of a relatively small-diameter tubular blank. Therefore, conventional development efforts have focused on two- and three-step processes for forming one-piece appliance handles. Unfortunately, as described below, these processes have disadvantages which limit their applicability to the production of appliance door handles and the like.

The general operations of bending, stretching, depressing and radially expanding a tubular blank, with or without a mandrel, are known. For the majority of metals, it is fairly easy to bend small diameter tubing into an arc having a large radius. But as the diameter of the tubing increases and the radius about which it to be bent decreases, the tube bending process requires some combination of compression at the inner bending radius of the tube and stretching at the outer radius. Although the outer bending surface of the tube may be stretched to the full extent of the material's rated elongation characteristics, one cannot satisfactorily bend a tube with a given diameter about a relatively small bending radius without encountering severe buckling at the inner bending surface or undesirable deformation at the outer bending radius. Some have been able to bend tubes with a certain diameter about relatively small bending radii by controllably dimpling or allowing controlled rippling of the inner tube surface, thereby creating less stretching of the outer tube surface.

Other examples of methods for bending a tube are disclosed in U.S. Pat. No. 4,704,886, which shows internally pressurizing a tube blank, gripping the opposite ends of the blank and applying longitudinal tension at the ends while applying a lateral force against the blank to bend the blank. U.S. Pat. No. 4,567,543, discloses depressing regions of the tube blank and then expanding the blank within a complementary shaped cavity formed by a pair of dies. U.S. Pat. No. 4,829,803 discloses forming a box-like frame member by internally-pressurizing a preformed tubular blank, closing a pair of die halves around the blank to partially deform the blank within mating die cavities, and then increasing the internal pressure to exceed the yield limit of the wall of the blank to expand the blank into conformity within the mating die cavities.

It is therefore desirable to provide an apparatus and method for forming a tubular blank into a tubular member having variations in the vertical and horizontal profiles, and in the cross-sectional configuration, thereof. Such an apparatus and method would result in substantial money savings for appliance door handles and the like.

SUMMARY OF THE INVENTION

The present invention eliminates the problems of inefficient material and labor consumption found with the formation of multiple-sectioned tubular members by providing an apparatus and method for forming one-piece tubular members.

According to a first aspect of the present invention, a one-step apparatus and method for forming a one-piece, complex-shaped tubular member from a tubular blank is provided. The tubular blank is placed in a die cavity defining a tube having at least two expanded portions and a bend therein. As the die cavity is closed around the tubular blank to form the bend, the interior of the tubular blank is pressurized to expand the tubular blank into the at least two expanded portions defined by the die cavity. When the bent and expanded tubular blank is removed from the die cavity, the ends of the tubular blank are cropped to form the finished tubular member.

According to a second aspect of the present invention, a two-step apparatus and method for forming a one-piece, complex-shaped tubular member from a tubular blank is provided. The tubular blank is placed in a first station having a die cavity defining an expanded tube having a varying cross-section. The tubular blank is internally pressurized to expand the tubular blank into the shape defined by the die cavity. At a second station, the expanded tubular blank is formed by introducing a bend therein. The expanded tube is placed in a second die cavity defining a tube having a bend therein. The interior of the expanded tubular blank is pressurized as the die cavity is closed around the expanded tubular blank to form the bend. When the bent and expanded tubular blank is removed from the die cavity, the ends of the tubular blank are cropped to form the finished tubular member.

According to an additional aspect of the present invention, the tubular blank may be transferred to additional stations where additional bends may be introduced to the tubular blank to form a complex-shaped tubular member. Furthermore, as the tubular blank is being expanded in the above-described aspects of the present invention, the ends thereof may be compressed to force material into the die cavities, thereby reducing the likelihood that the blank will burst during expansion. Additionally, as the expanded tube is being formed and bent, the flow of material into the die cavities may be controlled to reduce the amount of folding that may occur.

It is, therefore, an object of the present invention to provide an apparatus and method for producing one-piece, complex-shaped tubular members from tubular blanks.

It is another object of the present invention to provide a one-step apparatus and method for forming tubular members from tubular blanks.

It is another object of the present invention to provide a tube forming apparatus which produces tubular members free of defects such as ruptures and folding.

It is another object of the present invention to quickly and economically produce complex-shaped tubular members from tubular blanks.

It is still another object of the present invention to form complex-shaped tubular members from metallic tubular blanks.

It is still yet another object of the present invention to form tubular members having varying cross-sections along the length of the member.

Further objects and advantages of the present invention will become apparent from the following description of the preferred embodiments.

BRIEF DESCRIPTION OF THE DRAWINGS

FIG. 1 is a plan view of the preferred embodiment of the apparatus of the present invention.

FIG. 2 is a front elevational view of the apparatus shown in FIG. 1.

FIG. 3 is a cross-sectional view taken along line A—A of FIG. 1.

FIG. 4 is a plan view taken along line 4—4 of FIG. 3.

FIG. 5 is a plan view of the preferred embodiment of the lock block and sealing unit in an open position.

FIG. 6 is a plan view of the preferred embodiment of the lock block and sealing unit of FIG. 5 in an engaged position.

FIG. 7 is a side, partial cross-sectional view of an embodiment of hydroforming Station II.

FIG. 8 is a side, partial cross-sectional view of an embodiment of hydroforming Station IV.

FIG. 9 is a plan view of an embodiment of hydroforming Station V.

DETAILED DESCRIPTION OF THE PRESENTLY PREFERRED EMBODIMENTS

Figure 10:
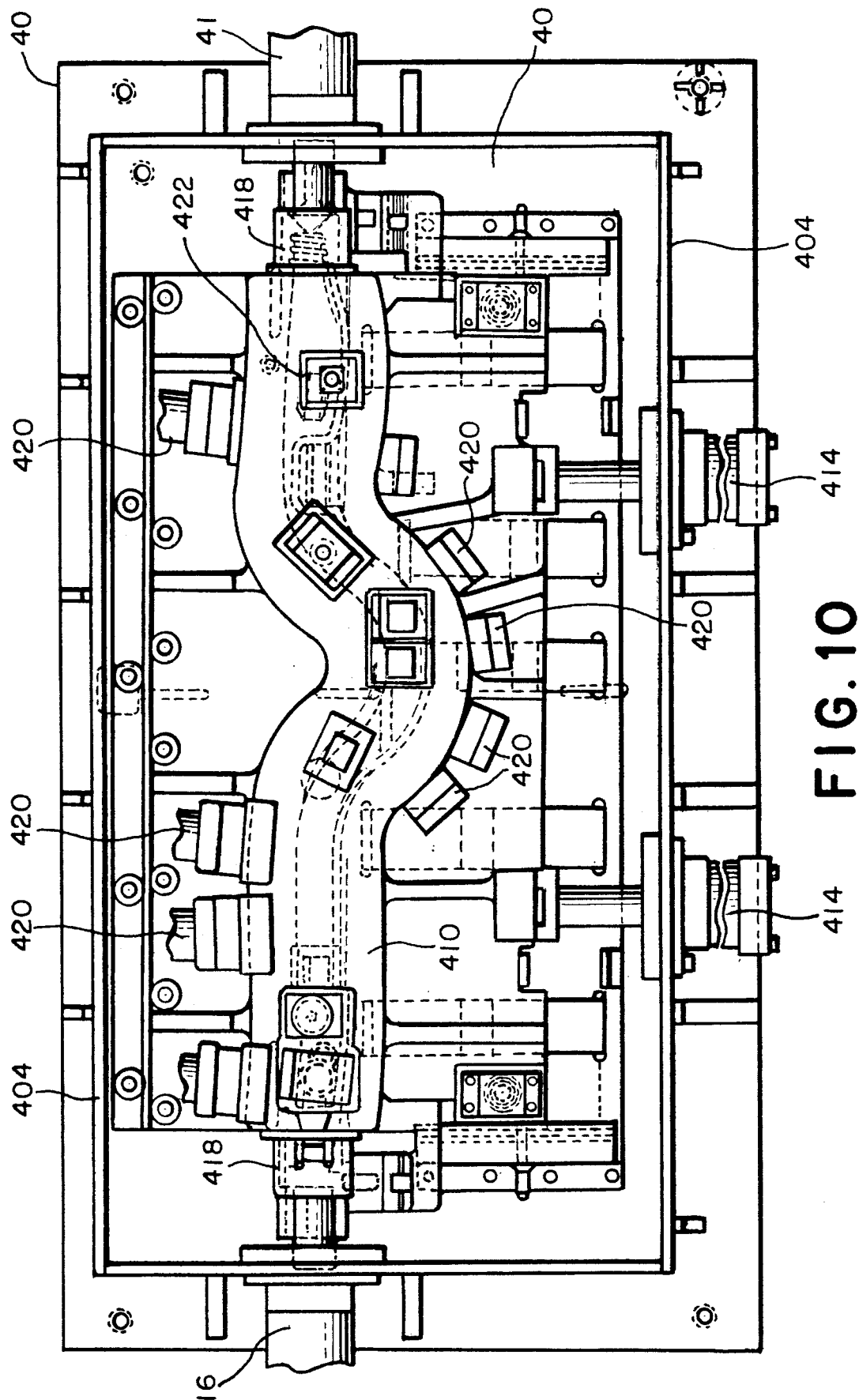
FIG. 10 is a plan view of an embodiment of hydroforming Station VI.

The present invention is an improvement of the apparatus and method disclosed in U.S. Ser. No. 07/945,322, which is hereby incorporated by reference, In that co-pending application, Stations I–VI were used to form a tubular member. However, as described below, the present invention eliminates the need for a number of the Stations disclosed in the co-pending application, or may be used in conjunction with similar embodiments of the Stations disclosed in the co-pending application. For ease of reference to the co-pending application, the apparatus of the present invention will be described as Station II herein.

FIGS. 1–6 illustrate the preferred apparatus of the present invention for forming a complex-shaped tubular member. In alternate embodiments of the present invention, additional apparatuses or Stations (similar to the preferred apparatus and/or to Stations III, IV, V, and VI described in detail in U.S. Ser. No. 07/945,322, which is hereby incorporated by reference) may be added to or used in conjunction with the most preferred apparatus and method for forming the tubular member, depending on the particular application.

In particular, the tubular member may have varying vertical, horizontal and/or cross-sectional profiles. In accordance with the presently preferred embodiment, the tubular member comprises an oven door handle. The invention described herein, however, may be adapted to form tubular members for a variety of purposes and structures including, for example, exhaust pipes.

Generally, a tubular blank 12 is delivered to a liquid-filled tub which includes the apparatus shown in FIGS. 1–6. Alternately, as described and shown as Station I in U.S. Ser. No. 07/945,322, an apparatus may deliver the tube blank 12 to the liquid-filled tub. In the tub, in the most preferred embodiment of the present invention, the blank 12 is compressed within a die cavity to form a bend therein while simultaneously being internally pressurized to create a varying diameter tube and, in particular, to form at least two bulges in the tubular blank, which are defined by the die cavity. After the blank has been bent, and bulged in at least two places at Station II, the tubular blank is removed from the apparatus and its ends cropped to form the finished tubular member.

In an alternate embodiment of the present invention, the tubular blank is not bulged and bent in the same die cavity of Station II. Rather, the tubular blank is expanded/bulged in the die cavity of Station II and is bent in a die cavity similar to that of Station II or of Station III (which is shown and described in U.S. Ser. No. 07/945,322), or in a combination of die cavities similar to those of Station II and of Stations III and IV (which are shown and described in U.S. Ser. No. 07/945,322). After the tubular blank has been bulged and bent in Station II (the apparatus of FIGS. 1–6), in the most preferred embodiment of the present invention, or in a combination of Station II and Station III (described and shown in U.S. Ser. No. 07/945,322) or Station II and Stations III and IV (described and shown in U.S. Ser. No. 07/945,322), in the alternate embodiment, the bulged and bent tube may be transferred to an apparatus similar to Station V (described and shown in U.S. Ser. No. 07/945,322) where another bend is introduced, the bend being in the same or a different plane from that of the bend introduced in Station II and Stations III and IV (shown and described in U.S. Ser. No. 07/945,322), depending on the embodiment of the invention. The tube may then be transferred to an end cropping station where the ends of the tube are cropped. Also, if necessary, regardless of the embodiment of the present invention, the tube may be transported to an apparatus similar to Station VI (described and shown in U.S. Ser. No. 07/945,322) where holes are pierced at various locations along the tubular member. If pierced, the tubular member is transferred to a flushing station where the interior of the tubular member is flushed of slugs before the tube is unloaded.

The present apparatus is located in a tub which is filled with a liquid wherein the tooling that occurs on the tube at the station is performed substantially submerged as will be described in detail hereinafter. The liquid used in a preferred embodiment of the present invention is 95% water. The remaining 5% consists of additives to prevent rust and corrosion and to aid in lubrication. This liquid is commercially available under the name Hydrolubric 143 from E. F. Houghton and Company.

When stations in addition to Station II (the apparatus shown in FIGS. 1–6) are used to form the tubular blank, a shuttle transfer system may be used to transfer the blank 12 from station to station. This shuttle transfer system is disclosed and described in detail in U.S. Ser. No. 07/945,322, which is hereby incorporated by reference. Other types of transfer systems of course can be used to deliver the tube from one station to another. Alternatively, the tube can be manually transferred from station to station.

STARTING MATERIAL

The tubular blank 12 is preferably a welded circular steel tube formed from cold rolled aluminum killed steel. The blank has an outer diameter preferably of about 9/16" with a starting thickness preferably ranging from about 0.022 to 0.032 inches. The material has an initial yield point of 34,000 p.s.i. and, with significant work hardening during forming, the yield strength approaches approximately 50,000 p.s.i. in the bulged regions.

Alternately, the blank 12 may be formed from aluminum, hot rolled aluminum killed steel, high strength low alloy steel, stainless steels, and other metallic tubular materials.

Station I

As stated above, Station I (shown and described in U.S. Ser. No. 07/945,322) may be used to deliver the tubular blank 12 to Station II (the apparatus shown in FIGS. 1–6). The description of Station I in U.S. Ser. No. 07/945,322 is hereby incorporated by reference.

Station II

FIGS. 1–4 illustrate various views of the preferred apparatus 30 of hydroforming station II. The apparatus 30 of station II is located in a tub (not shown) defined by a base and side walls which is filled with the liquid described above. The apparatus 30 generally includes two die halves 38 and 40, and a combination sealing unit 642 and lock block 644 located at the ends 48 of the die halves 38 and 40. The die halves 38 and 40 include upper interchangeable form steels 700, lower interchangeable form steels 702, wear strip plate 704, heel thrust block 706, lower die shoe plate 708, and connecting steel 710. FIGS. 1, 2 and 6 best illustrate the lock blocks and sealing units in their engaged position. The closed die halves define therein a die cavity as shown by dashed lines 51.

FIG. 2 illustrates a front elevational view of hydroforming station II shown in FIG. 1. While only one half of station II is illustrated in FIGS. 1–4, hydroforming station II is generally symmetrical about centerline 56. The tube defined by the die cavity has two bulged regions 77 located near the ends of the cavity 60. The tube defined by the die cavity may have a tapered cross-section on each side of the bulge regions 77 and a bend therein. While the bulge regions 77 are shown located near the ends of the die cavity 60, they can be located along any portion of the die cavity 60. In addition, more than two bulges and more than one bend may be provided in the die cavity. The outer diameter of the tubular blank 12 is less than the diameter of any section of the die cavity 60.

The length of the tubular blank 12 must be longer than the length of the tube defined by the die cavity 60. Thus, when the blank 12 is placed in the die cavity 60, the ends 62 of the blank 12 extend outside of the die cavity 60. Preferably the die cavity has a length of 32 inches while the tubular blank 12 has a length of 40 inches. The present invention, however, can be used with other size tubes and die cavities and is not limited to the specific dimensions described.

The preferred lock block 644 and sealing unit 642 is shown in FIGS. 5 and 6. As shown, the lock block 644 comprises two oppositely disposed, pivotable clamp blocks 600 cooperative to form a cylindrical bore 668 extending horizontally therethrough. The diameter of the bore 668 is slightly larger than the outer diameter of the tubular blank 12.

Each of the clamp blocks 600 is pivotally connected to the lock block 644 by a pivot pin 602, and comprises a bearing surface 604 located on the side of the block 600 opposite from the bore 668. The lock block 644 further comprises two bearing surfaces 606 located in a spaced relationship to the bearing surfaces 604 of the respective clamp block 600. The function of the bearing surfaces 604, 606 will be discussed in greater detail below.

The sealing unit 642 comprises a generally cylindrical rod portion 680 extending perpendicularly from the center of a base 682. Additionally, the sealing unit 642 comprises two arms 608 extending from the base 682 and having bearing pads 610 attached thereto. The bearing pads 610 are operative to engage the bearing surfaces 604, 606 of the respective clamp block 600 and the lock block 644 to close and open the clamp blocks 600, as will be fully described below.

The rod 680 is mounted to the base 682 by conventional means. The diameter of the rod 680 is slightly less than the diameter of the bore 668 in the lock block 644. A portion of the rod 680 is milled away at one end to create a chamfer 684, whose diameter is less than the inner diameter of the blank 12 so that only the end portion of the rod 680 can be inserted into the blank 12. A lumen 686 extends through the rod 680 and a portion of the base 682. A source of pressurized fluid (not shown) is connected to one end of the lumen 686, while the other end of the lumen 686 communicates with the interior of the blank 12 when the sealing unit 642 is translated to its engaged position.

To translate the sealing unit 642, the base 682 is driven toward the blank 12 by a driving means, including but not limited to an hydraulic cylinder 712 or a screw and motor combination. As the base 682 is translated, the arms 608 move from the position of FIG. 5 to the position shown in FIG. 6. During this movement, the arms 608 and the bearings pads 610 move between the bearing surfaces 604, 606 of the lock block 644 and the respective clamp block 600. As the bearing pads 610 of the arms 608 move from the neutral bearing surface 622 to the inclined bearing surface 624 of each clamp block 600, the clamp blocks 600 are pivoted about the pivot pins 602 to engage the blank 12, as shown in FIG. 6.

While the clamp blocks 600 are being pivotally moved by the arms 608, the rod 680 of the sealing unit 642 is inserted through the bore 668 of the clamp blocks 600 to engage the blank 12. When the rod 680 of the sealing unit 642 is fully engaged with the blank end, fluid is first pumped through the blank 12 to expel any air that might have been trapped inside the blank 12 when it was placed in the tub. After the blank 12 has been purged, the sealing units 642 are activated to apply pressure to the interior of the blank 12.

An alternate embodiment of the lock block and sealing unit that may be used in the present invention is described in detail in U.S. Ser. No. 07/945,322, which is hereby incorporated by reference.

As described previously, station II is generally symmetrical about its center line 56. Therefore, the opposite exposed end of the blank 12 (not shown) also has an identical lock block and sealing unit (not shown) associated therewith. There are, however, variations which may be made to station II to accomplish the objects of the present invention. For example, station II may be asymmetrical with only one sealing unit at one end of the tube. In addition, the shape defined by the die cavity may be asymmetrical about the center line. The present invention is not limited to the particular parts illustrated but may be used to create various parts to be used in many areas such as automotive, which require tubing having various shapes.

The operation of station II will now be described with reference to FIGS. 1–6. Before the blank 12 is delivered to Station II, the die halves 38 and 40 are open and the lock block 644 and sealing units 642 are retracted. As described above, the blank 12 is delivered to the tub and immediately sinks into the bath below the fluid level. The forming operation of station II is performed completely submerged in the aqueous bath within the tub. Because the blank 12 is submerged in the fluid-filled tub before the lock block 644 and sealing units 642 engage its ends, the interior of the blank is filled with the liquid. A limit switch (not shown) may be provided which signals the receipt and proper placement of a blank in the ready position. The limit switch, along with any other appropriate and desired sensors, may be disposed throughout the apparatus to send signals to a microprocessor (not shown) which governs the overall operation of machine.

After verification of the proper positioning of the incoming blank 12, as shown in dashed lines labeled 714 in FIG. 2, the die halves 38 and 40 are forced together to their closed position to form the tubular member. Also, before the die halves 38 and 40 are closed, the exposed ends of the blank 12 are inserted in the bores 668 of the lock blocks 644 and the clamp blocks 600 are pivoted about the pivot pins 602 to engage the blank 12.

As previously described, while the clamp blocks 600 are being pivotally moved by the arms 608, the rod 680 of the sealing unit 642 is inserted through the bore 668 of the clamp blocks 600 to engage the blank 12. When the rod 680 of the sealing unit 642 is fully engaged with the blank end, fluid is first pumped through the blank 12 to expel any air that might have been trapped inside the blank 12 when it was placed in the tub. After the blank 12 has been purged, the sealing units 642 are activated to apply pressure to the interior of the blank 12.

As described previously, before the lock block 644 and sealing units 642 engage the blank 12, the interior of the blank 12 is filled with the fluid of the aqueous bath since the blank is submerged below the surface of the bath. When the block and sealing units engage the blank, the internal pressure of the blank is increased by supplying pressurized fluid to the interior of the blank through the lumen 686 of the sealing unit 642. The internal pressure applied to the tube rises above the yield limit of the tube. However, the internal pressure does not exceed the yield limit of the tube until the die has "bottomed" and the tube has been fully encapsulated. Otherwise, undesired and uncontrolled bulging of the tube would occur.

Alternately, it may be possible to form the blank 12 in a one-step process by placing the blank in the bath at Station II (wherein the blank 12 will be submerged in the fluid), closing the lock blocks 644 and the sealing units 642 to seal the ends of the blank 12, closing the die halves 38, 40 to their fully closed position to bend the blank 12 (without the addition of external hydraulic pressure to the interior of the blank 12), and either allowing a change in volume of the blank 12 to increase the internal pressure of the blank 12 beyond the yield limit of the blank 12 to expand the blank 12 or supplying external pressure to increase the internal pressure of the blank 12 to expand the blank 12.

In the most preferred embodiment of the present invention, as previously discussed, the die halves 38, 40 define a bulged and bent tube that corresponds to the finished tubular member. Therefore, station II can provide a one-piece tubular member in one step. However, this one-step process does not achieve superior results when the circumference of the tubular blank is expanded more than about 20% or when the final shape of the tubular member is not substantially round, i.e., formed of sharp angles. In those cases, it is necessary to form the tubular member in at least two steps, as will be described below in conjunction with stations III–V, which are disclosed in U.S. Ser. No. 07/945,322, which is hereby incorporated by reference. In the two-step process, alternately, it may be possible to expand the blank 12 without the addition of external hydraulic pressure to increase the internal pressure of the blank 12 beyond its yield limit. Rather, a change in volume in the blank may be sufficient to cause the pressure of the fluid present in the blank 12 to increase beyond the yield limit of the blank 12, depending on the size of the blank 12 and the part to be formed. Additionally, it was discovered that when the circumference of the tubular blank is increased up to about 20%, regardless of the final shape of the tubular member, the two-step process can be used to form the tubular member without the need for compressive hydroforming, which is described in U.S. Ser. No. 07/945,322.

When the circumference of the tubular blank is expanded by more than about 20% in the bulge regions 77, the two ends of the tubular blank must be compressed to force tubular blank material into the bulge regions to prevent the blank from bursting. This compressive force may be applied to the two ends of the tubular blank by the sealing units disclosed in U.S. Ser. No. 07/945,322, which is hereby incorporated by reference. By further translating the sealing unit towards the die halves after the ends of the blank are sealed, the tubular blank is placed under compression. The compressive force applied by the sealing units acts in combination with the pressurized interior of the blank 12 to assist in allowing metal to flow into the die cavity 60. This interaction of the compressive force applied to the end of the blank and the pressure applied to the interior of the blank causes the tubular blank to fill the die cavity 60 defined by the die halves 38 and 40, while decreasing the amount of thinning of the tube wall. Metal from the ends of the tubular blank 12 is allowed to flow into the die cavity 60. As the metal from the ends of the blank flow into the die cavity 60, the sealing units translate to remain engaged with the ends of the blank.

A 40 inch blank having a diameter of 0.562 inches with a wall thickness of approximately 0.025 inches exposed to the above-described pressures and forces could create a bulged tube having a final length of 38 inches with a 0.815 inch major diameter (ellipse) bulge. The thickness of the tube wall in the bulged region could be expected to be reduced by approximately 6 to 8% and it is believed that smaller reductions in thickness may be possible. Greater expansions have been achieved, such as a 50% increase in diameter. However, the length of the blank must be sufficient to allow the blank material to flow into the die cavity to reduce the amount of thinning in the tube wall. Consistent with other considerations, if the tubular blank is of sufficient length, the finished bulge diameter could exceed 100% expansion with zero thinning. However, in a preferred embodiment, frictional constraints and the rate of deformation (i.e., strain hardening rate) suggest useful production applications of approximately 50% expansion.

It was also discovered during the operation of station II that the blank is prone to plastic buckling of the tube wall. This plastic buckling leads to the tube spiralling within the unoccupied die cavity regions thereby creating folds in the wall of the tube where there is a rapid change in the diameter of the die, such as in the bulge regions 77. It was found that the magnitude of the spiralling can be reduced by increasing the internal pressure of the blank as it is being formed. The increased internal pressure must be sufficient to stabilize the blank wall without causing the blank to burst. It was found that increasing the internal pressure of the tube from about 1,500 p.s.i. to about 3,100 p.s.i. helped reduce the buckling.

The internal and external pressures applied to the tube are regulated by electronic and pneumatic control systems as is well known by those skilled in the art. The increase in internal pressure applied to the tube can be achieved by a mechanical intensifier.

After the tube has been expanded, the pressure applied to the interior of the tube is turned off. A purge valve (not shown) is opened to release the internal pressure in the tube. The attached sealing units 642 are pivoted to translate the lock blocks 644 away from the blank 12, and the die halves are opened.

Once the die halves are opened, the tube may be lifted from the tub of station II. If additional forming is required to finally form the tubular member, the tubular blank is delivered to the appropriate station.

Station III

In an alternate embodiment of the present invention, as stated above, stations embodying similar apparatuses to those of Station II and Stations III– VI in co-pending application U.S. Ser. No. 07/945,322 may be used to preform or finally form the bulged tube. The detailed discussion of Stations III–VI in U.S. Ser. No. 07/945,322 is hereby incorporated by reference.

In particular, as shown in FIG. 7, a bend may be introduced into the bulged tube if one was not formed in Station II. The bend introduced at Station III may be increased, if required, at station IV, which is described in detail in U.S. Ser. No. 945,322.

Station IV

FIG. 8 illustrates a side, cross-sectional view of an embodiment of hydroforming Station IV where the formed tube of Stations II and/or III may be further bent so that a vertical bend is formed therein. Station IV is substantially identical to Station III, except for the die cavity formed by the die 300 and punch 302. Therefore, like station III, Station IV only alters the vertical profile of the tube. Station IV operates in a manner identical to that of station III, which is described in detail in U.S. Ser. No. 07/945,322. The same internal pressure as used in station III is maintained in the tube at station IV.

Station V

If desired, a lateral bend may be introduced into the bulged and vertically bent tube. The desired shape of the part preferably has a varying cross-section with both a vertically and laterally varying profile.

FIG. 9 illustrates the plan view of the die 300 of station V. Before the tube formed by Station II and/or Stations II–IV is delivered to Station V and placed in the die cavity of the die 300, it is rotated 90 degrees so that the vertical bend formed by Stations II, III and/or IV becomes horizontal. The die cavity formed by the die and the punch defines a vertically bent tube with a varying cross-section. The vertical bend of station V is, however, perpendicular to that formed by stations II, III and IV. While the inclination of the bends formed at stations II–V are referred to as vertical or horizontal, other orientations are possible which are dependent upon the part to be produced.

Because the ends of the tube are not altered from station to station, the sealing units are identical to those described with reference to Station II, and thus need not be described in detail.

Station VI

FIG. 10 illustrates a plan view of station VI. The tooling of station VI may be used to pierce holes into the tubular member, as fully described in Ser. No. 07/945,322, which is hereby incorporated by reference.

While the present invention has been illustrated with respect to a particular tubular member, tubular members having other dimensions and shapes may be formed according to the teachings of the present invention. For example, the present invention can be used to form automotive exhaust system components such as down pipes and manifold pipes. By forming two bulges in a tubular blank at approximately ¼ and ¾ of the length of the blank, and by cutting the blank in three places—along the largest diameter of the two bulge regions and at the midpoint between the two bulge regions—four exhaust system components are formed. Furthermore, any type of suitable appliance handle may be formed with the present invention.

While tubular members constructed of components formed by aluminum extrusions are known, aluminum extrusions are limited to a constant-cross-section and, therefore, a constant structural strength throughout the length of the extrusion. The present invention can take a tubular blank and expand it in desired areas preferably by as much as 50%. This expansion of the tubular member results in increased structural strength levels due to cold working and controlled or minimized thickness loss. Therefore the structural strength and the cross-section of the tubular member may be varied to meet the exact loading conditions throughout the tube.

While the invention has been shown and described in connection with particular preferred embodiments, it is apparent that certain charges and modifications, in addition to those mentioned above, may be made by those who are skilled in the art without departing from the basic features of the present invention. Accordingly, it is the intention of the Applicants to protect all variations and modifications within the true spirit and valid scope of the invention.

What is claimed is:

1. A method for forming a complex-shaped tubular metal member from a tubular blank having two ends, comprising the following steps:

(a) applying hydraulic pressure inside of the tubular blank;

(b) applying mechanical forces to bend the tubular blank while the hydraulic pressure is being applied inside of the tubular blank;

(c) increasing the hydraulic pressure inside the tubular blank to expand at least two sections of the tubular blank so as to form bulge regions, a circumference of at least one of said bulge regions being at least about 20% larger than the circumference of the tubular blank;

(d) axially compressing the ends of the tubular blank to permit the metal to flow into the expanding sections so as to reduce the thinning of the metal in said sections.

2. The method of claim 1 wherein the step of expanding and bending the tubular blank is performed within a die cavity.

3. The method of claim 1 wherein the two ends of the tubular blank are sealed when internal pressure is applied to expand the at least two portions of the tubular blank.

4. The method of claim 1, further comprising the step of controlling the flow of tubular blank material as the bend is being formed in the tubular blank.

5. A method for forming a complex-shaped tubular metal member from a tubular blank having two ends, comprising the following steps:

(a) placing the tubular blank in an open die cavity defining a complex-shaped tubular member having at least two expanded portions, at least one of said expanded portions having a circumference at least 20% larger than that of the tubular member and varying lateral and vertical configurations;

(b) closing the die cavity including at least two dies while hydraulically pressurizing inside of the tubular blank causing the tubular blank to be bent by the dies and causing the tubular blank to expand the tubular metal member to fit the shape of the die cavity;

(c) compressing the ends of the tubular metal member during step "b" to allow the metal to flow into the expanding regions of the tubular metal member;

(d) opening the die cavity; and (e) removing the complex-shaped tubular member with at least two expanded portions, at least one of said expanded portions having a circumference at least 20% larger than that of the tubular metal member.

6. The method of claim 5 wherein the two ends of the tubular blank are sealed when internal pressure is applied to the tubular blank in step c) to cause the tubular blank to expand into the at least two expanded portions defined in the die cavity.

7. The method of claim 6 wherein the two ends of the tubular blank are compressed when the tubular blank is expanded in step c) into the at least two expanded portions defined in the die cavity.

8. A method for forming a complex-shaped tubular metal member from a tubular blank having two ends, comprising the following steps:

(a) applying hydraulic pressure to the inside of the tubular blank so as to expand at least two portions of the tubular blank to enlarge the circumference of the tubular blank by at least about 20%;

(b) compressing the ends of the tubular blank during step (a) to reduce thinning of the metal in the portions being expanded;

(c) mechanically bending the tubular blank in a vertical and horizontal direction while the inside thereof is under hydraulic pressure to form the complex-shaped tubular metal member.

9. The method of claim 8 wherein the steps of expanding and bending the tubular blank are performed within die cavities.

10. A method for forming a tubular member from a tubular blank, comprising the following steps:

(a) placing the tubular blank in an open first die cavity defining a tube having at least two expanded portions, at least one of said two expanded portions having a circumference at least 20% larger than that of the tubular blank;

(b) closing the first die cavity;

(c) pressurizing the interior of the tubular blank to cause the tubular blank to expand into the at least two expanded portions defined in the first die cavity to form an expanded tubular member, said expanded portions each having a circumference at least 20% larger than that of the tubular blank;

(d) compressing the two ends of the tubular blank in axial direction during step (c);

(e) opening said first die and removing the expanded tubular member from the first die cavity;

(f) transferring the expanded tubular member to an open second die cavity defining a tube having varying elevational and cross-sectional configurations;

(g) closing the second die to produce varying elevational and cross-sectional configurations by bending said expanded tubular member;

(h) opening said second die and removing said expanded tubular member having varying elevational and cross-sectional configurations.

11. The method of claim 10, further comprising the step of sealing the two ends of the tubular blank after the first die cavity is closed in step (b).

12. The method of claim 10, further comprising the steps of:

a) placing the bent and expanded tubular blank of step h) in an open third die cavity defining a tube having a smaller radius of curvature than the tube defined by the second die cavity;

b) deepening the bend in the bent and expanded tubular blank by closing the third die cavity; and c) removing the bent tubular blank from the third die cavity.

13. The method of claim 12, further comprising the steps of:

a) placing the bent tubular blank from the third die cavity in an open fourth die cavity defining a tube having varying elevational, lateral and cross-sectional configurations;

b) forming at least one bend in the bent tubular blank by closing the fourth die cavity; and c) removing the tubular blank from the fourth die cavity.

14. A method for forming a tubular member from a tubular blank having two ends, said method comprising the following steps:

(a) placing the tubular blank in an open first die cavity defining a tube having at least two expanded portions, the circumference of each expanded portion being at least 20% larger than that of the tubular blank;

(b) closing the first die cavity;

(c) pressurizing the interior of the tubular blank while simultaneously compressing the two ends of the tubular blank to cause the tubular blank to expand into the at least two expanded portions defined in the first die cavity to form an expanded tubular member;

(d) opening said first die cavity;

(e) transferring the expanded tubular member to an open second die cavity having at least two dies and defining a tube having varying elevational and cross-sectional configurations;

(f) applying hydraulic pressure below the yield limit inside the tubular member in said second die cavity and closing the second die cavity to mechanically bend the expanded tubular member by the action of the dies to produce a bent and expanded tubular member;

(g) opening said second die cavity;

(h) transferring said bent expanded tubular member to a third die cavity defining a tube having varying elevational, lateral and cross-sectional configurations;

(i) applying hydraulic pressure inside said bent expanded tubular member above the yield limit of the tubular member while closing the third die cavity to produce a bent expanded tubular member having varying elevational lateral and cross-sectional configurations;

(j) opening said third die cavity and removing said bent expanded tubular member having varying elevational, lateral and cross-sectional configurations.

15. The method of claim 14, further comprising the steps of:

a) placing the bent and expanded tubular blank of step h) in an open fourth die cavity defining a tube having a smaller radius of curvature than the tube defined by the second die cavity;

b) deepening the bend in the bent and expanded tubular blank by applying internal pressure to the tubular blank as the fourth die cavity is closed;

c) removing the bent tubular blank from the fourth die cavity; and d) transferring the tubular blank to the third die cavity.

16. An apparatus for forming a tubular member from a tubular blank having two ends, comprising:

(a) a die cavity defining a tube having at least two expanded portions, each of said expanded portions having a circumference at least about 20% larger than that of the tubular blank, said tube having a varying cross-sectional configuration; and (b) an internal pressurizing device for applying internal pressure to the tubular blank to expand the tubular blank into the at least two expanded portions defined by the die cavity when the die cavity is closed, the die cavity forming a tubular member having varying elevational and cross-sectional configurations; and (c) means for compressing the two ends of the tubular member to allow the tubular member to expand into the at least two expanded portions defined by the die cavity.

17. The apparatus of claim 16 wherein the means for applying internal pressure to the tubular blank comprises a pair of seals for sealing the two ends of the tubular blank.

18. An apparatus for forming a tubular member from a tubular blank having two ends, comprising a die cavity defining a tube having at least two expanded portions, each of said expanded portions having a circumference at least 20% larger than that of the tubular blank, a varying elevational configuration and a varying cross-sectional configuration, the die cavity comprising a pair of seals for sealing the two ends of the tubular blank, the pair of seals operative to allow hydraulic fluid to internally pressurize the tubular blank and expand the tubular blank into the at least two expanded portions defined by the die cavity, the die cavity operative to form a tubular member having varying elevational and cross-sectional configurations and means for compressing the two ends of the tubular member to allow the tubular member to expand into at least two expanded portions defined by the die cavity.

19. An apparatus for forming a tubular member from a tubular blank having two ends, comprising:

(a) a first station comprising a die cavity defining a tube having at least two expanded portions, the circumference of each of said expanded portions being at least 20% larger than that of the tubular blank, a pair of seals for sealing the two ends of the tubular blank and for delivering hydraulic pressure to the interior of the tubular blank, the hydraulic pressure operative to expand the tubular blank into the at least two expanded portions defined by the die cavity, and means for compressing the two ends of the tubular blank as the tubular blank is expanded;

(b) a second station comprising a cooperating punch and die operative to form a tube having varying elevational and cross-sectional configurations, and a pair of seals for sealing the two ends of the tubular blank and for delivering hydraulic pressure to the interior of the tubular blank while the tubular blank is being compressed between the punch and die;

(c) a third station comprising a cooperating punch and die operative to form a tube having varying elevational, lateral and cross-sectional configurations, and a pair of seals for sealing the two ends of the tubular blank and for delivering hydraulic pressure to the interior of the tubular blank while the tubular blank is being compressed between the punch and die; and (d) means for transferring the tubular blank between the first, second, and third stations.

* * * * *